(12) United States Patent
Estrada et al.

(10) Patent No.: US 8,010,056 B2
(45) Date of Patent: Aug. 30, 2011

(54) METHOD OF SELECTING ONE OF DUAL ANTENNAS

(75) Inventors: Andrew Xavier Estrada, San Diego, CA (US); Shouichi Isogai, Okazaki (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/416,269

(22) Filed: Apr. 1, 2009

(65) Prior Publication Data

US 2009/0185702 A1 Jul. 23, 2009

Related U.S. Application Data

(62) Division of application No. 11/406,035, filed on Apr. 17, 2006, now Pat. No. 7,539,517.

(60) Provisional application No. 60/761,730, filed on Jan. 23, 2006.

(51) Int. Cl.
*H04B 1/44* (2006.01)

(52) U.S. Cl. ...... 455/78; 455/83; 455/575.2; 455/575.6; 455/575.7; 379/420.01; 379/420.02; 379/420.04

(58) Field of Classification Search .............. 455/575.2, 455/575.6, 575.7, 569.1, 522.1, 562.1, 277.1, 455/560, 78, 83; 379/420.01–420.04, 428.02
See application file for complete search history.

(56) References Cited

U.S. PATENT DOCUMENTS

| | | | | |
|---|---|---|---|---|
| 6,005,525 A * | 12/1999 | Kivela | ......................... | 343/702 |
| 6,118,773 A * | 9/2000 | Todd | ............................. | 370/334 |
| 6,483,884 B1 * | 11/2002 | Shen et al. | .................... | 375/347 |
| 6,980,165 B2 * | 12/2005 | Yuasa et al. | ................... | 343/718 |
| 7,529,288 B2 * | 5/2009 | Felbecker et al. | ............ | 375/133 |
| 7,535,971 B2 * | 5/2009 | Yen et al. | ...................... | 375/267 |

OTHER PUBLICATIONS

Andrew Estrada, "Wireless Headphones with Dual Antennas", File History for pending U.S. Appl. No. 12/434,356, filed May 1, 2009 (1168-192.CON).

* cited by examiner

*Primary Examiner* — Tuan A Pham
(74) *Attorney, Agent, or Firm* — John L. Rogitz

(57) ABSTRACT

A wireless headphone assembly has left and right speakers attached to ends of a headphone body, and at least two antennas, e.g., one located at each speaker. Reception can be improved by selecting a "best" one of the antennas based on a quality metric.

5 Claims, 3 Drawing Sheets

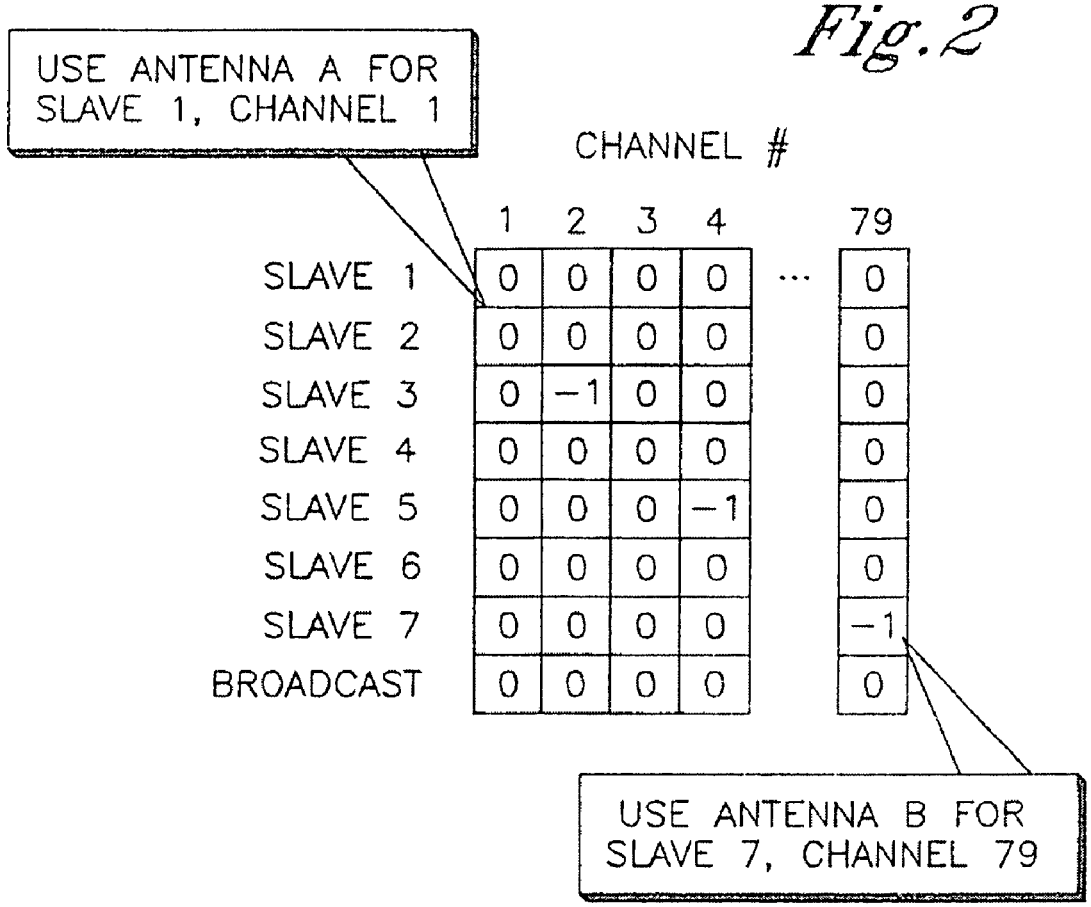
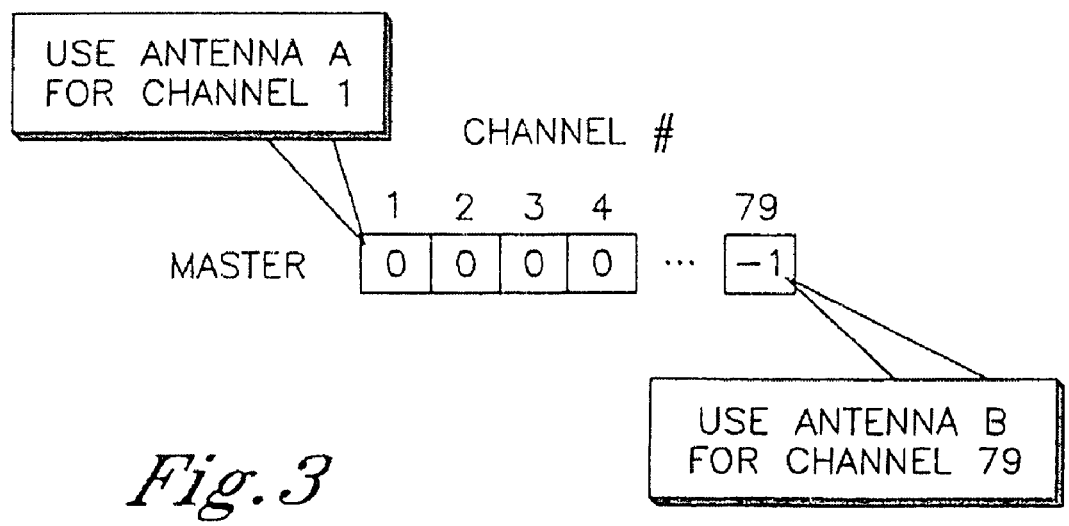

METHOD OF SELECTING ONE OF DUAL ANTENNAS

This application is a divisional of U.S. patent application Ser. No. 11/406,035, filed Apr. 17, 2006, now U.S. Pat. No. 7,539,517 which in turn claims priority to U.S. provisional patent application Ser. No. 60/761,730, filed Jan. 23, 2006, from both of which priority is claimed by the instant application.

FIELD OF THE INVENTION

The present invention relates generally to methods of selecting one of dual antennas for use, particularly but not exclusively with wireless headphones.

BACKGROUND OF THE INVENTION

Wireless headphones have been provided for a number of applications, including listening to television audio, portable music players, and computer game audio. As understood herein, a drawback of wireless headphones is that they sometimes "drop out" (effectively stop playing audio on the headphone speakers) because of a variety of reasons, including antenna nulling, body shadowing, multipath fading, etc. The present invention further understands that it would be desirable to address this problem without increasing transmission power, which can be wasteful of power, or increasing audio buffering or receiver sensitivity, which can lead to cost increases. Accordingly, with these observations in mind, the present invention is provided.

SUMMARY OF THE INVENTION

A method is disclosed for selecting one and only one antenna to use at a time for a device such as a receiver or transceiver with at least first and second antennas. The method includes establishing a count N, and if N is greater than or equal to zero, indicating that the first antenna is to be used. Otherwise (i.e., if N is negative) the second antenna is indicated for use. For each of successive monitoring periods, at least one performance metric of the antenna in use is monitored, and if the performance metric indicates bad performance, N is incremented by one if N is negative or decremented by one when it is zero or positive. In contrast, if the performance metric indicates good performance, N is decremented by one if N is negative or incremented by one if N is zero or positive. Thus, the antennas are switched upon a change of the sign of N. In some implementations, when two transceivers are communicating with each other, each transceiver may execute the method independently to select its own antenna for transmission and reception.

The metric may be packet integrity, with a "good" determination requiring that the packet be perfectly received in some implementations or in other implementations be received with no more than minor errors. Or, the metric can be received signal strength indication (RSSI). Yet again, a combination of metrics can be used, e.g., if either the packet is determined to be good or if the RSSI is determined to be above a threshold, the absolute value of N is increased, and is only decreased if both the packet is bad and RSSI is low. Other metrics that may be used include but are not limited to bit error rate (BER) and packet error rate (PER).

In another aspect, a wireless headphone includes a body configured to fit onto a user's head and defining opposed ends, with a first speaker being coupled to the body and juxtaposed with the first end and a second speaker being coupled to the body and juxtaposed with the second end. At least first and second antennas are coupled to the body. At least one wireless receiver is supported by the body and is electrically connected to at least one of the antennas. If the first antenna is selected, it is used for providing signals to both speakers as long as the first antenna provides acceptable performance, with the second antenna not being used. On the other hand, the second antenna is used in lieu of the first antenna when the first antenna no longer provides acceptable performance.

In still another aspect, a processor selects one and only one antenna to use at a time for a device with at least first and second antennas. The processor executes logic that includes establishing a count N, and if N is at least zero, indicating that the first antenna is to be used, otherwise indicating that the second antenna is to be used. The logic also includes, for each of successive monitoring periods, monitoring whether performance associated with the antenna in use is good or bad, and if during a monitoring period bad performance is detected (as indicated by, e.g., low BER, low PER, low packet integrity, etc.), incrementing N by one if N is less than zero, and otherwise decrementing N by one. Further, if during a monitoring period good performance is detected, the logic includes decrementing N by one if N is less than zero, and otherwise incrementing N by one.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 illustrates a table that can be maintained by a master to facilitate the selection protocol shown in the pseudocode below;

FIG. 3 illustrates a table that can be maintained by a slave; and

DETAILED DESCRIPTION OF THE PREFERRED EMBODIMENT

Figure 1:
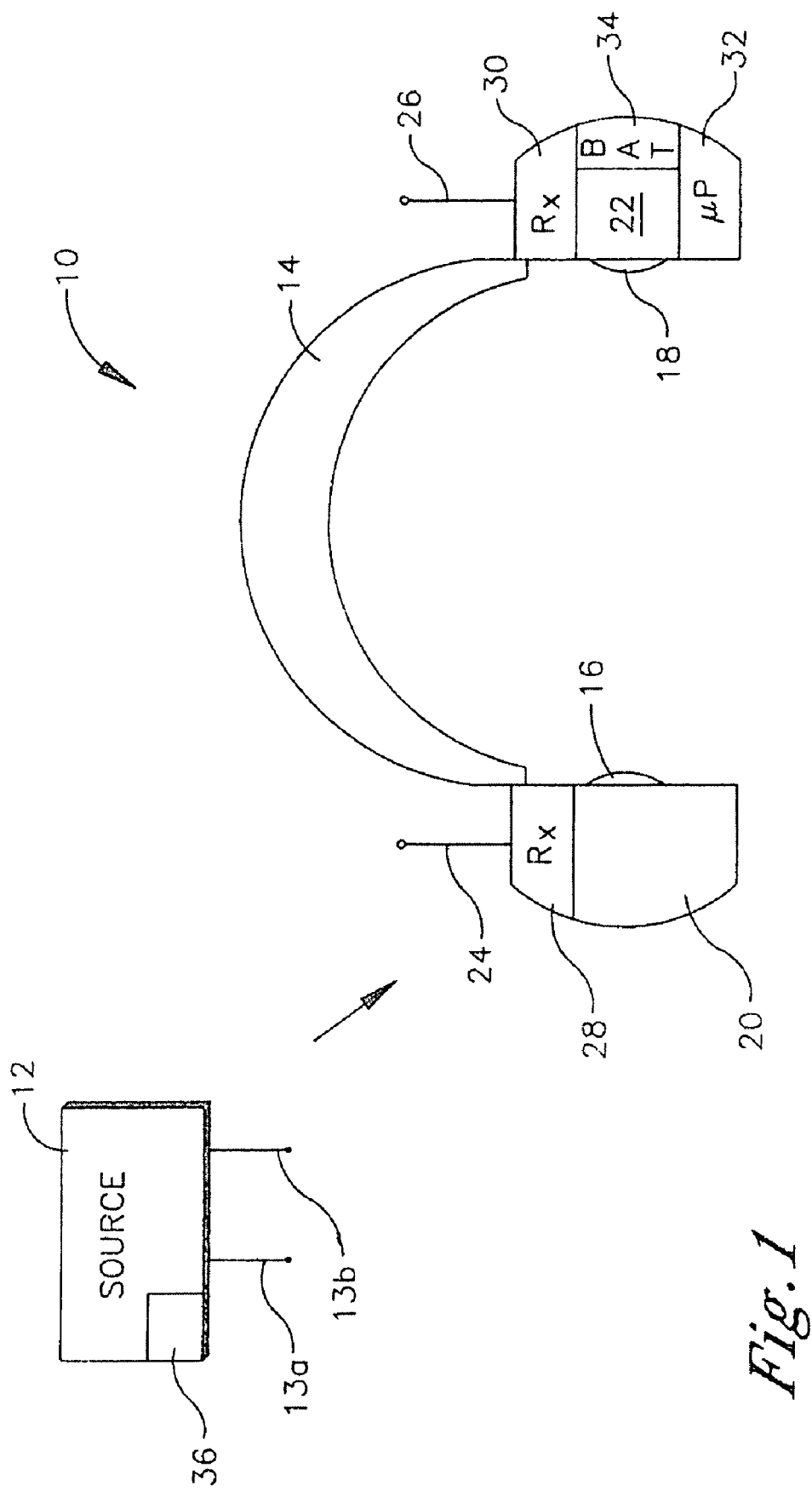
FIG. 1 is a schematic diagram of the present wireless headphones.

Referring initially to FIG. 1, a headphone assembly 10 is shown, generally designated 10, which receives wireless audio signals from a source 12 such as but not limited to a portable music player, game device, etc. The source 12 can have two or more transmitting antennas 13a, 13b. The wireless signals can be but are not limited to Bluetooth signals. While headphones are shown, the present antenna selection algorithm can be implemented in any appropriate wireless receiver and/or transceiver.

As shown, the headphone assembly 10 includes an elongated body 14 that fits on or around the head of a person. Accordingly, in non-limiting embodiments the body 14 may be slightly elastic and curved as shown, or it may simply be a cord.

In accordance with headphone principles known in the art, the body 14 has opposed ends, and juxtaposed with the ends of the body 14 are respective speakers 16, 18. In the embodiment shown, the speakers 16, 18 are borne on padded speaker mounts 20, 22 that are configured for comfortably fitting against a user's ear.

In any case, the headphone assembly 10 includes at least first and second antennas 24, 26. In the non-limiting embodiment shown, the first antenna 24 can be juxtaposed with the first speaker 16 and the second antenna 26 can be juxtaposed with the second speaker 18, although both antennas may be on the same speaker mount or on the body. The antennas 24, 26 may be mounted on the body 14 or on the speaker mounts 20, 22 to receive signals from the source 12. Preferably, to reduce the likelihood that a signal from the source 12 will be in null zones of both antennas simultaneously, the first antenna 24 has a first nulling direction and the second antenna 26 has a second nulling direction different from, e.g., orthogonal to, the first.

Each antenna 24, 26 may be associated with a respective wireless receiver 28, 30 as shown, with each receiver 28, 30 being supported on the body 14 or on respective speaker mounts 20, 22 as shown. In other implementations only a single receiver need be used. In the latter case, the processor discussed below, prior to executing antenna selection as discussed herein, executes a pre-selection multiplexing step in which the first antenna 24 is connected to the receiver, the output of the receiver is evaluated, then the second antenna 26 is connected to the receiver and the output of the receiver is re-evaluated.

The receiver or receivers 28, 30 are electrically connected to a processor 32 so that signals from the receivers 28, 30 are processed by the processor 32 in accordance with disclosure below. The processor 32 may be mounted anywhere on the headphone assembly 10, such as on one of the speaker mounts 20, 22 as shown. More than one processor can be provided to execute the logic below. One or more dc batteries 34 are also supported on the assembly 10, e.g., on one of the speaker mounts or on the body 14, to power the receivers and processor. The source 12 may have a source processor 36 that also functions in accordance with disclosure below.

Now referring to FIG. 2, a table is shown that the processor 36 of the source 12 (referred to herein as a "master") may maintain in its local memory in accordance with the antenna select protocol discussed further below in relation to pseudocode. As shown, the table includes a single numeric value entry for each potential frequency channel, it thus being understood that communication between the source 12 and headphones 10 may be on one or more channels. In the table that is maintained by the master, the table may also contains entries for each receiver, referred to herein as "slaves". In non-limiting implementations the table may also contain entries for special modes like page, scan, and broadcast.

In any case, as shown in FIG. 2 each entry contains a signed integer, with a positive sign (including a value of zero) indicating that the first antenna 13a should be used for communicating with the associated slave on the associated channel and with a negative sign indicating that the second antenna 13b should be used. The table may be initialized with a default value indicated by nonvolatile parameter DefAntVal, typically equal to 0. As the below-discussed algorithm progresses, it updates table entries as appropriate. In the non-limiting example of FIG. 2 most of the entries indicate that antenna 13a should be used. The Broadcast entry may be used for non-directed transactions such as inquiry or page scan. In non-limiting embodiments each table entry can be updated approximately once every 800 milliseconds assuming a 79-channel hopping pattern.

FIG. 3 shows that the processor 32 of the headphones ("slave") can also maintain a table substantially identical to that of FIG. 2 except it maintains only a single row associated with the "master". Accordingly, both the master processor and slave processor may independently execute the algorithm shown below in pseudocode to select which of their respective antennas will be used, or only one of the processors may execute it.

The following metrics provide an indication of channel quality to the firmware. These are provided for completeness, because not all necessarily need be used by the algorithm.
1) Received signal strength indication (RSSI) is an eight-bit signed integer that typically is on a log scale in units of dBm.
2) Bit error rate (BER) preferably is calculated from many packets
3) Packet error rate (PER) preferably is calculated from many packets, typically more packets than are required for BER.
4) Packet integrity typically may be measured using a single packet, with a "good" packet being a packet that is received with no errors (or minor errors) and with a "bad" packet being a packet that is received with non-minor errors or that is not detected. By "minor errors" is meant, in one non-limiting example, only five to seven errors detected in the access code, correctable errors in the packet header, and correctable errors in the payload.
5) A combination of the above, e.g., a "Conditioned Packet integrity" that may be a combination of RSSI and packet integrity. For instance, if packet integrity is low and RSSI is high, interference might be indicated and thus the antenna in use should not be penalized for a "bad" packet, whereas if RSSI is low, interference is not indicated. In some implementations a weighted average of packet integrity can be used, wherein N packets are used from the same antenna, same slave, and same channel, the greatest weight is assigned to the most recent packets, and a weighted average of packet integrity scores may be used. Also, a number of consecutive bad packets may be used as a metric.

Thus, RSSI may be used for two purposes, i.e., to judge good or bad packets or as indicia to differentiate between bad packets due to a poor channel and bad packets due to interference. As stated above, a packet that is bad due to a poor channel will have both bit errors and low RSSI, whereas a packet that is bad due to interference will have bit errors but a strong RSSI. Thus, the skilled artisan will note that in the non-limiting pseudocode below, when a packet is detected with bit errors and strong RSSI, no update is made to the antenna selection table.

Figure 4:
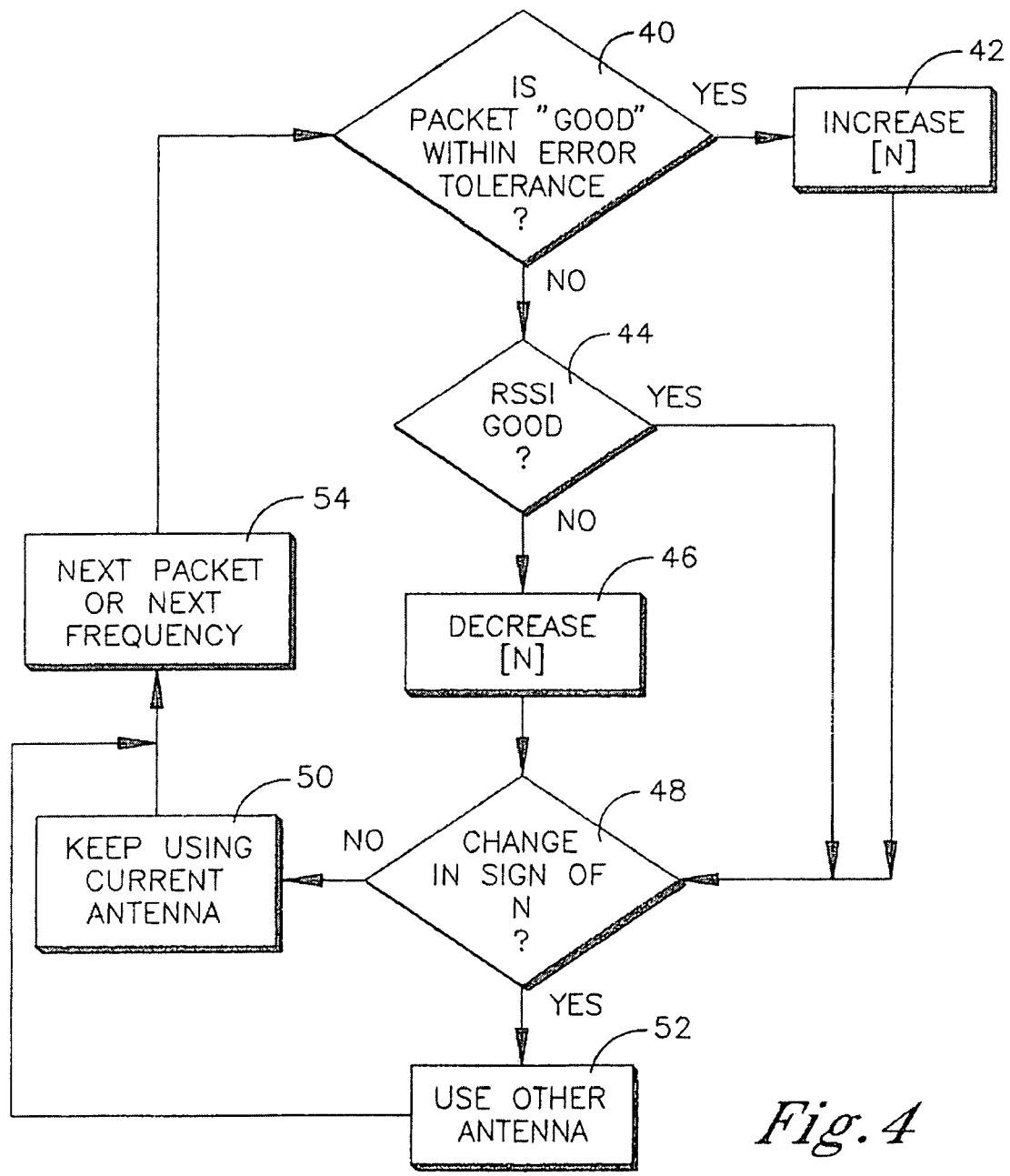
FIG. 4 is a flow chart of a non-limiting example of the logic.

With the above in mind, attention is now directed to FIG. 4, which shows an example antenna select protocol that may be executed by either the source 12 (as "master" using the table in FIG. 2) or by the headphones 10 (as "slave" using the table in FIG. 3) using the non-limiting metrics of packet integrity and RSSI for illustration. Commencing at decision diamond 40, it is determined whether the packet under test is "good" within an error tolerance. In one implementation the packet is "good" only if it is perfectly received, while in other embodiments the packet is "good" if it contains no more than minor errors as discussed above. As stated above, however, multiple packets may be used in the test at decision diamond 40 using metrics such as BER, PER, number of consecutive bad packets, etc.

When a "good" packet is determined, the logic flows to block 42 to increase the absolute value of N in the table for the channel (and when undertaken by the master, the slave) under test, i.e., if the sign of N is not negative the value of N is incremented by one, and if the sign of N is negative the value of N is decremented by one. In some implementations the absolute value of N is not permitted to exceed a maximum value.

On the other hand, if the packet is not good the logic may selectively flow to decision diamond 44 to determine whether RSSI is good, i.e., whether RSSI exceeds an acceptability threshold. In this way, the algorithm recognizes that a single bad packet need not indicate bad reception at the antenna when the received signal strength remains high. If RSSI is high the logic flows to decision diamond 48 to function as described below, but if both a bad packet and low RSSI exists the logic flows to block 46 to decrement by one the absolute value of N except when N=0 prior to block 46, in which case N is set to −1 by the operation at block 46.

Decision diamond 48, arrived at from blocks 42 and 46 and from decision diamond 42 when RSSI is good, indicates that when no change of the sign of N occurs as a result of the operation at block 46, the antenna being currently used remains the antenna of choice at block 50. When, however, the sign of N has changed, the previously unused antenna is placed in service at block 52. Antenna switching preferably occurs between packets, and allows sufficient time for antenna select set up time and antenna select hold time. The next packet and/or next channel is then obtained at block 54 and the logic loops back to decision diamond 40 as shown.

The pseudo code below provides another representation of logic that may be used. The pseudocode reflects that flags may be set to invoke (or not) consideration of parameters such as RSSI and minor errors, it being understood that other parameters may be used as discussed above.

N=counting variable which indicates current antenna selection (zero or greater indicates a first antenna should be used to transmit and receive on the respective frequency and less than zero indicates that the opposite antenna should be used)

Nmax=# of consecutive bad packets required for an antenna switch

R=RSSI threshold

CF=condition flag (if true, RSSI threshold is to be considered)

EF=error flag (if true, minor errors are to be considered)

FF=freeze flag (if true, freeze selection table, no updates allowed)

The following pseudo-code describes the algorithm for a single entry in the table:

```
1)   Initialize value "N" or entry to default value (typically 0)
2)   Receive packet
3)   If CF = true
        a.   Then determine if RSSI > R
4)   Determine if packet is good or bad
5)   If EF = true
        a.   If good packet contains minor errors
                i.   Then packet is bad
6)   If FF = false, then adjust the value of N for the associated table
     entry as follows
        a.   If packet is good
                i.   If entry >= 0 AND entry < Nmax − 1
                        1.   Then increment N by 1
                ii.  If entry < 0 AND entry > −Nmax
                        1.   Then decrement N by 1
        b.   If packet is bad
                i.   If CF = false
                        1.   If entry >= 0 AND entry < Nmax − 1
                                a.   Then decrement N by 1
                        2.   If entry < 0 AND entry > −Nmax
                                a.   Then increment N by 1
                ii.  If CF = true and RSSI < R
                        1.   If entry >= 0 AND entry < Nmax − 1
                                a.   Then decrement N by 1
                        2.   If entry < 0 AND entry > −Nmax
                                a.   Then increment N by 1
```

When two transceivers (designate them "A" and "B" for exposition) independently implement the antenna selection method disclosed herein, the following protocol may be followed in some non-limiting embodiments:

1) transceiver A receives a packet from transceiver B and determines if it is good or bad;
2) transceiver A updates its selection table and if necessary switches antenna;
3) transceiver A then uses the selected antenna to transmit a packet to transceiver B;
4) transceiver B receives a packet from transceiver A and determines if it is good or bad;
5) transceiver B updates its selection table and if necessary switches antenna;
6) transceiver B then uses the selected antenna to transmit a packet to transceiver A.

As recognized herein, if the above protocol is not followed, it may be possible that either transceiver might transmit before updating its table or properly selecting its antenna, in which case the system could fail to converge on the optimal antennas. For this reason, it is preferred that the two transceivers operate in turn, each completing one cycle of the algorithm before proceeding on to transmit the next packet.

While the particular METHOD OF SELECTING ONE OF DUAL ANTENNAS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A wireless headphone, comprising:
a body configured to fit onto a user's head, the body defining opposed ends;
a first speaker coupled to the body and juxtaposed with the first end;
a second speaker coupled to the body and juxtaposed with the second end;
at least first and second antennas coupled to the body; and
at least one wireless receiver supported by the body and electrically connected to at least one of the antennas, wherein if the first antenna is selected, it is used for providing signals to both speakers as long as the first antenna provides acceptable performance, the second antenna not being used, the second antenna being used in lieu of the first antenna when the first antenna no longer provides acceptable performance, wherein packets received by the receiver are tested for both (1) signal strength and (2) packet error rate, wherein an indication of unacceptable performance can result only in response to at least one packet having an error rate outside an error tolerance and signal strength below a signal strength threshold, wherein an indication of unacceptable performance cannot result otherwise, such that an antenna switch is not made unless an antenna has both signal strength below the signal strength threshold and packet error rate outside the error tolerance.

2. The headphone of claim 1, wherein the performance is evaluated based at least in part on a count of packets containing errors exceeding an error threshold.

3. The headphone of claim 2, wherein the antennas are switched only if the sign of the count changes.

4. The wireless headphone of claim 1, wherein the first antenna is juxtaposed with the first speaker and the second antenna is juxtaposed with the second speaker.

5. The wireless headphone of claim 1, further comprising a processor supported on the body and executing an antenna selection protocol.

* * * * *